5 Sheets—Sheet 1.
A. W. SCHARIT.
DEVICE FOR PRODUCING MOTIVE POWER BY THE VERTICAL RISE AND FALL OF THE TIDE.
No. 45,867. Patented Jan. 10, 1865.
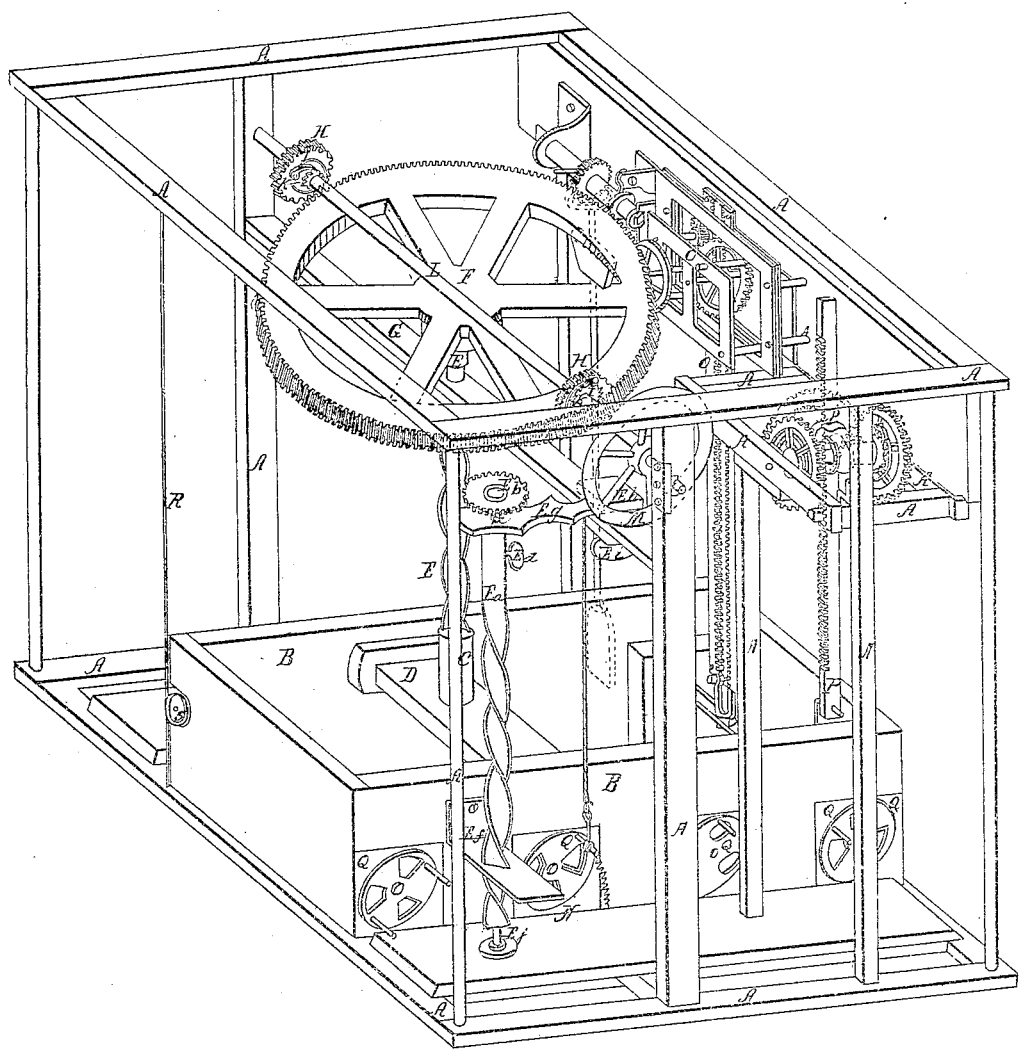
Witnesses
Jos Peck
Wm Ryan
Inventor
A. W. Scharit A. W. SCHARIT.
DEVICE FOR PRODUCING MOTIVE POWER BY THE VERTICAL RISE
AND FALL OF THE TIDE.
No. 45,867. Patented Jan. 10, 1865.
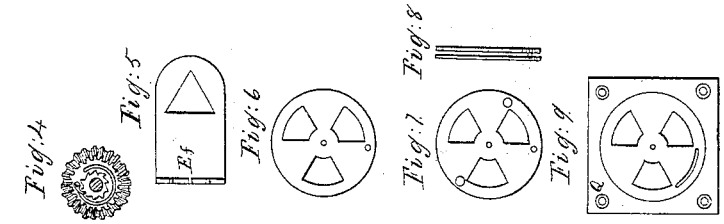
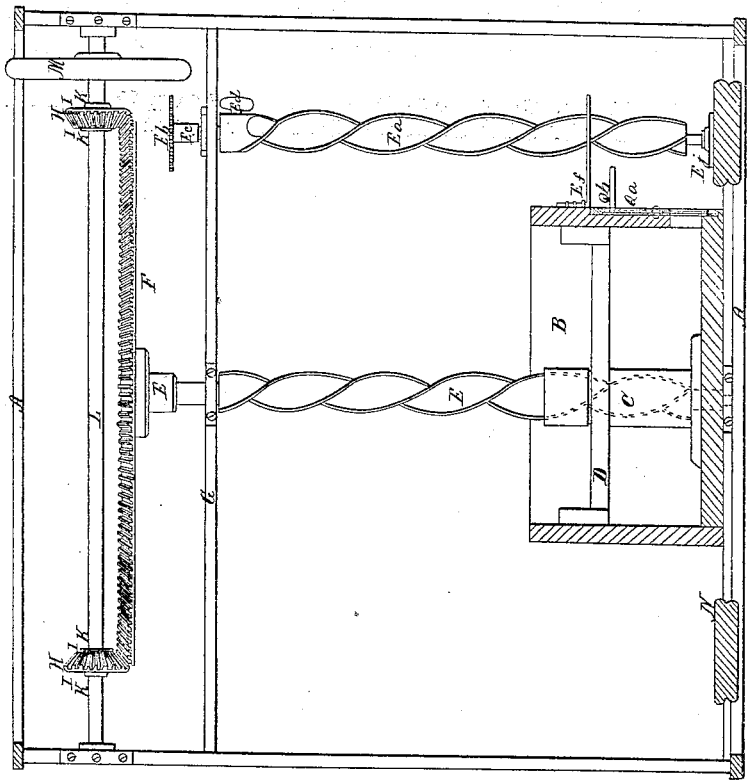
Witnesses
Inventor 5 Sheets—Sheet 3.
A. W. SCHARIT.
DEVICE FOR PRODUCING MOTIVE POWER BY THE VERTICAL RISE AND FALL OF THE TIDE.
No. 45,867.          Patented Jan. 10, 1865.
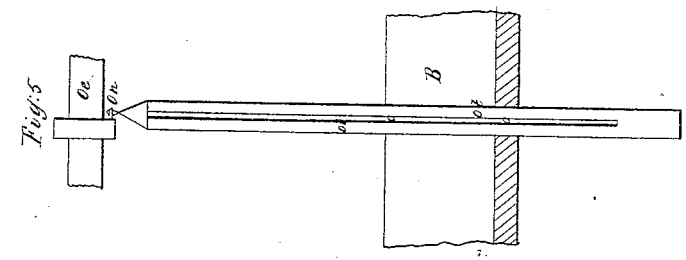
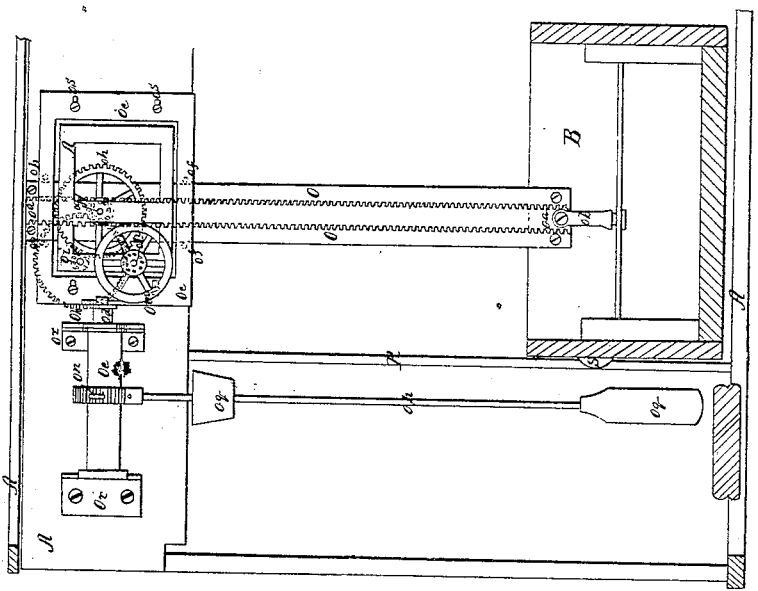
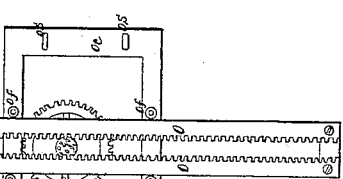
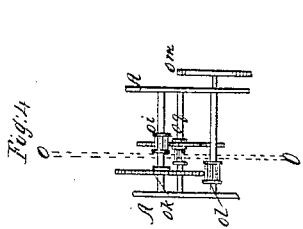
Witnesses
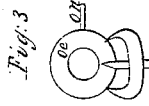
Inventor
A. W. Scharit 5 Sheets—Sheet 4.
A. W. SCHARIT.
DEVICE FOR PRODUCING MOTIVE POWER BY THE VERTICAL RISE AND FALL OF THE TIDE.
No. 45,867.           Patented Jan. 10, 1865.
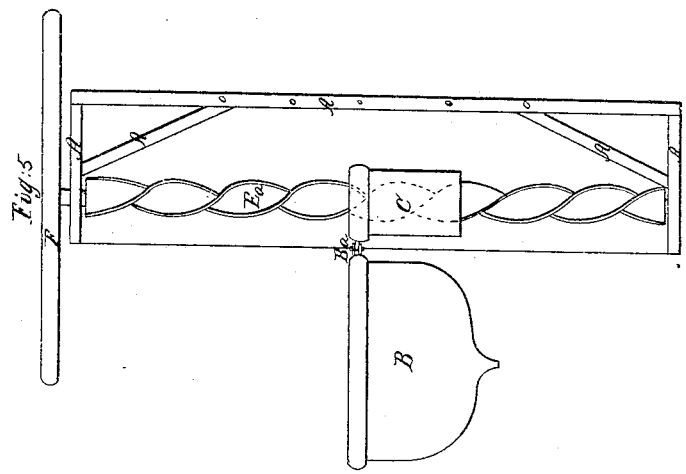
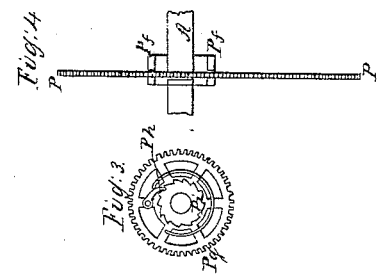
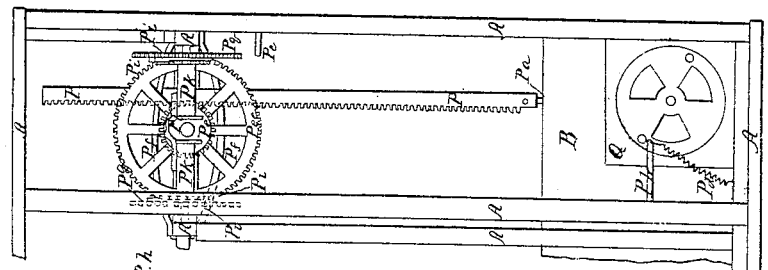
Witnesses
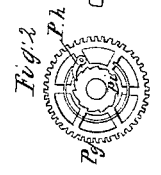
Inventor
A. W. Scharit 5 Sheets—Sheet 5.
A. W. SCHARIT.
DEVICE FOR PRODUCING MOTIVE POWER BY THE VERTICAL RISE AND FALL OF THE TIDE.
No. 45,867. Patented Jan. 10, 1865.
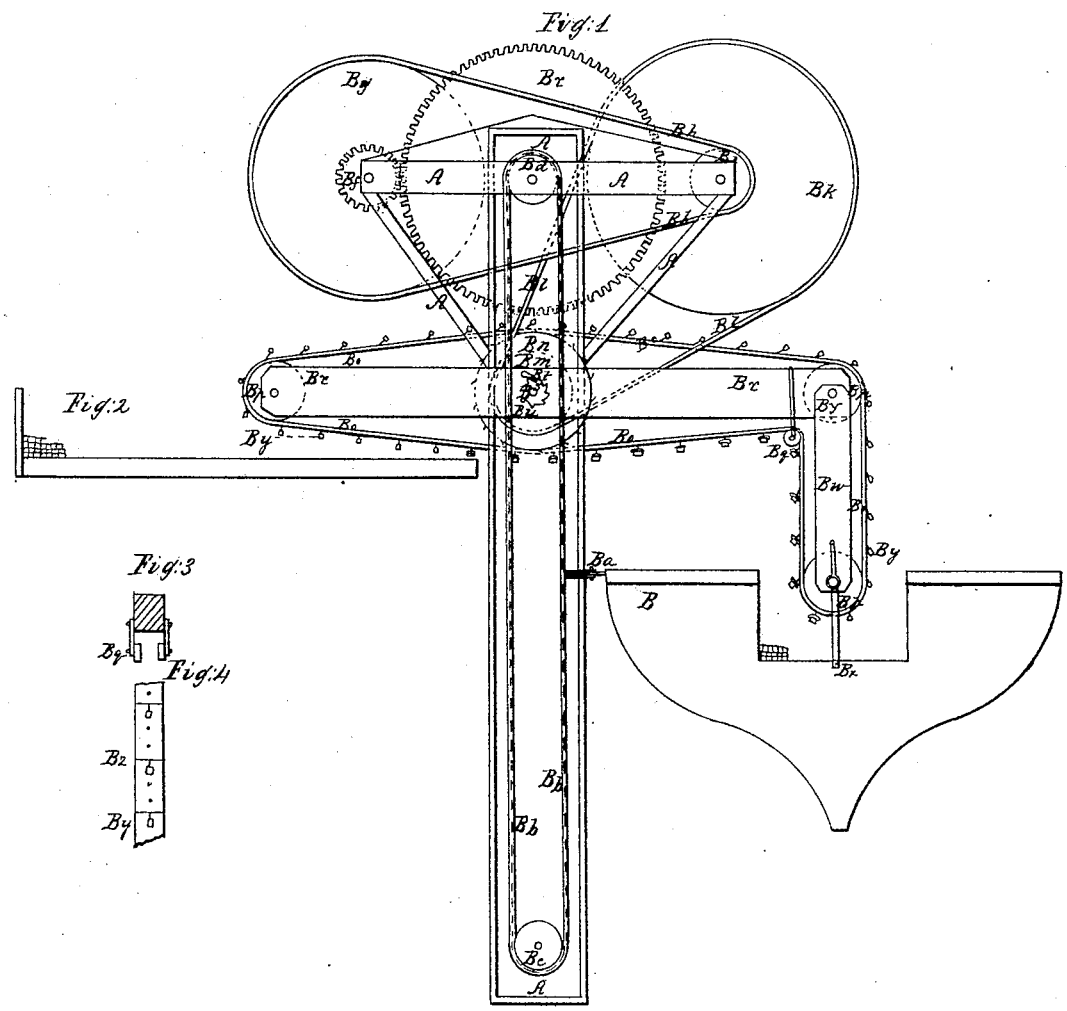
Witnesses
Inventor
A. W. Scharit

UNITED STATES PATENT OFFICE.

AUGUSTUS W. SCHARIT, OF ST. LOUIS, MISSOURI.

IMPROVED DEVICE FOR PRODUCING MOTIVE POWER BY THE VERTICAL RISE AND FALL OF THE TIDE.

Specification forming part of Letters Patent No. 45,867, dated January 10, 1865.

*To all whom it may concern:*

Be it known that I, AUGUSTUS W. SCHARIT, a citizen of the United States, and of the city and county of St. Louis and State of Missouri, have invented a new and useful method of obtaining power from the action of the tide, for propelling machinery and for loading and unloading vessels thereby, which I have called "Tide Water-Works" or "Tidal Automatic Motor," and describe substantially as follows:

One modification of my invention is that of propelling machinery by virtue of the vertical pressure of the rising tide upon a hollow float or vessel ascending empty with the flood, and by virtue of its gravitating power descending filled with the ebbing tide. This I effect by means of the following mechanism or their mechanical equivalents.

First. By means of an upright screw or twisted shaft, rising from a step or socket below low-water mark and passing through a stationary nut in the float or vessel, or attached on the outer side thereof, which screw or twisted shaft is provided with a horizontal cog-wheel above the tide, intersecting with two small cog-wheels on a horizontal shaft opposite to each other, on the periphery of said larger wheel, and at right angles with the same. These smaller wheels I furnish with two pairs of pawls, each on opposite sides of said wheels, prepared to act upon two pairs of ratchets cut or secured on the shaft, so as to change or control the direction of the motion of said shaft or stop the same at will. From this shaft power may be taken for whatever purpose required, and the velocity of motion may be accelerated and governed by any of the usual means employed for that purpose, the momentum being ample therefore.

Second. By means of a vertical double rack or pair of parallel racks, whose teeth shall face each other on opposite sides of a horizontal cog-wheel or shaft, so that one side pressing against the same in rising and the other in descending shall yield a continuous motion in one given direction when shifted from side to side by hand, or by the action of the tide itself to accommodate its rise and fall, which said shifting may be effected by either the alternate lifting and gravitating power of the tide or the oscillating force of the current, the former method by acting upon an upright slotted rod attached to any float or vessel moving up and down by the tide; or the latter by means of an arm or lever moved to and fro by the current, operating respectively upon a screw, so as to slide from side to side a guide plate or frame slotted for convenience of sliding, and grooved and provided with friction-rollers for the reception, retention and shifting the parallel racks, as above described, or by any other well known mechanical means, whereby said double rack may be shifted either by hand or automatic agency, as may be required.

Third. By means of a single vertical rack bearing against a cog-wheel on a horizontal shaft provided with another, and may be, larger wheel, on whose periphery two smaller cog-wheels, each furnished with double ratchets and pawls on the opposite sides, and arranged so as to yield a continuous motion in either direction as required, in manner similar to that hereinbefore described in connection with the first-mentioned cog-wheel and screw.

Fourth. By means of an endless chain, pulley, and drum, arranged in such a way that one side of the chain shall have a bearing, or be attached to the float or vessel in rising, and the other side in descending.

In order to enable others skilled in the mechanical arts to make and use my invention, I will proceed further to describe its construction and operation. To that end I do hereby declare that the following is a more clear and exact description thereof, reference being had to the annexed drawings, and making a part of this specification, in which—

Sheet No. 1 presents a perspective view of three separable yet conjoined methods which I have united with the float or vessel, and combines together for the purpose of obtaining power from the vertical action of the tide, or will be more fully described hereinafter.

Sheet No. 2 represents the union of the float or vessel with the screw or screws disconnected from the double and single racks. It also represents the structure of the double-sided valves and other parts of the float or vessel, which are exhibited together in No. 1.

Sheet No. 3 represents five figures, No. 1 showing the connection of the double rack with the float or vessel disconnected from the screws and single rack, which are connected together in Sheet No. 1. The other figures on said sheet represent the several parts of the double rack and its appurtenances for changing, controlling, and multiplying motion, all of which, except Fig. No. 5, are exhibited combined together in Sheet No. 1.

Sheet No. 4 represents the union of the float or vessel with the single rack disconnected from the screw and double rack. It also represents the several parts thereof detached, which are mostly exhibited together in Sheet No. 1. It also represents in Fig. No. 1 the portable framework, screw, nut, and wheel, and a connection with the float or vessel, which may be so constructed as to be carried on shipboard and secured to any wharf or quay and vessel, when required as a motive power, to be used in connection with the gearing represented in drawing on Sheet No. 5, or with any other known means for multiplying motion and for loading and unloading vessels.

Sheet No. 5 represents another separable yet co operating method of obtaining power for propelling machinery and for loading and unloading vessels by the vertical action of the tide and for other purposes, by means of an endless chain, pulleys, pinions, wheels, beams, bands, and hooks, and other dependent parts therein delineated and described to be employed as an "automatic stevedore," which is connected with my tide-water works and made a part thereof, and which may also be made portable and at will connected with the vessel itself or the float which is to be loaded and unloaded thereby, as is illustrated in the drawings. This modification of my method, although not represented in Sheet No. 1, is nevertheless so clearly set forth in the drawings, descriptions, and specification, and claimed in connection therewith, as to constitute a part of the mechanism necessary to be used to form a complete combination of all the several combinable parts herein specifically claimed for obtaining power by the vertical action of the tide upon a float or vessel, for driving one or more kinds of machinery as may be desired, and for loading and unloading vessels thereby.

When the mechanism embraced in the drawings is used as a stationary means for propelling machinery, or as a stationary stevedore, it may be protected in stormy weather from swells and surges by inclosing the same beneath the building quay or wharf where it is used in such a manner that the tide shall only be admitted underneath, and by any suitable self-acting valves or openings, guarded on the outer side with a net-work of wire—coppered wire to be preferred—so as to exclude drifts and all other extraneous bodies therefrom.

On Sheet No. 1, made a part of these specifications, A is the frame-work; B, float or vessel; C, stationary nut passing through the vessel or through a water-tight tube connected with float; D, brace to nut C, connecting it with vessel; E, screw or twisted shaft passing through nut C and cross-tie G into cog-wheel F; F, cog-wheel secured on top of screw or shaft E, and turning with it; G, cross-tie, through which shaft E passes and revolves; H H, cog-wheels revolving on shaft L, intersecting at right angles with cog-wheel F, and driven alternately by it in opposite directions; I I, fellows of a pair of pawls on opposite and reverse sides of both cog-wheels H H, of which only one of each pair is represented; L, shaft driven continuously in either direction, as may be required, by using either pair of pawls on ratchets pointing in the given direction, or both pairs, being pinned or clasped up by means of pins inserted into holes provided in the wheels for that purpose, or by any other known mechanical means, will allow the cog-wheels H H to revolve in either direction without turning shaft L, or by bringing down all four pawls upon both pairs of ratchets simultaneously stop the entire machinery at once; E$a$, independent removable screw or twisted three-cornered shaft-driving cog wheel E$b$, fastened to it by shaft E$c$, which passes down into screw E$a$, through movable brace E$g$, which is itself fastened to cross-tie G by clamp E$h$ and thumb-screw E$i$, said shaft E$c$ being secured in screw or shaft E$a$ by thumb-screw E$d$, and turning with it; O O, double rack and its connection with float B, together with its aperture for shifting and for multiplying motion, as is more fully delineated in drawing or Sheet No. 3; P, single rack and its appendages connected with float B, as is more fully described in Sheet or Drawing No. 4; Q, connection of valves, springs, cord, and float B, as is more fully described in Drawing or Sheet No. 2; R, rock or guide for friction-roller S; S, friction-roller to traverse on rod R; T, tide-water level at the ebb, the float at rest with the valve open.

Sheet No. 2 represents in Fig. No. 1 the first modification hereinbefore in part described, and referred to for fuller description—thus—A is the frame-work; B, section of float or vessel; C, stationary nut secured to vessel, and water-tight, through which shaft C is moved by the rise and fall of the tide and float B; D, brace securing nut C to float B; E, twisted shaft or screw driven by nut E and driving cog-wheel F, to which it is secured; F, cog-wheel, driven by shaft E and driving cog-wheels H H; H H, cog-wheel driven by cog-wheel F, and provided with pawls, springs, holes, pins, or clasps, so arranged as to act or suspend their action on ratchets K K K K, when required; I I I I, twin pairs of pawls, springs, holes, and pins; K K K K, twin pairs of ratchets; L, shaft driven by cogs H H, from which power may be taken and the velocity multiplied by cogs and pinions, drums, and bands or any other known mechanical means, and controlled and regulated by any ordinary governor or well-known mechanical means proper for that purpose; M, fly-wheel; N, low-water mark; E$a$, independent screw or shaft movable at pleasure, illustrating the facility with which such detachment may be made, and, also, that any number of screws or shafts will work in harmony on the same float or vessel; E$b$, cog-wheel from which power may be taken from shaft E; E*e*, shaft connecting screw E*a* by means of thumb or hand screw, E*d*; E*f*, kneed plate or nut attached to float B, and acting on screw E*a* as float moves.

Fig. 3 represents a section of shaft L, with ratchet K on shaft, and with pawl and spring on cog-wheel H; Fig. 4, the reverse side of Fig. 3; Fig. 5, top view of nut plate or kneed nut, which in Fig. 1 is shown to be screwed on float B.

My double-sided valve, designed to resist pressure equally from either side, is represented in drawings on Sheet No. 1, open and shut, at letters Q Q Q Q.

On Sheet No. 2, Fig. 1 represents a section of float B, with at letter Q*a* a vertical half of the valve, showing the three plates of which it is constructed, the arm up and extending horizontally from the front, the central pivot-pin on which the inner and outer plates partly revolve, the whole so shaded as to throw the lower aperture in the valve open.

Figs. 6, 7, 8, and 9 on said Sheet represent severally the principal parts when disconnected. Thus No. 6 represents the inside plate; No. 7, the outside plate; No. 8, a vertical view of the inside plate No. 6 and outside plate No. 7, joined together by a pin at the bottom, which pin, when at home on the dividing-plate No. 9, plays in the slot. No. 9 represents one side of the stationary or dividing plate, with four screw holes on the corners for securing it on float B, with openings and apertures for water or fluids to pass through, and with slot for pin or screw fastening inner and outer plates together to play in and with a raised rim or outer circle or socket, within which the plate, when joined together, shall revolve on the central pivot so far as the slot permits.

Sheet No. 3 is also a part of these specifications. Fig. No. 1 represents the float or vessel in connection with the double rack. A is the frame-work; B, float or vessel in connection with racks; O O, double rack; O*a*, rack-tie securing racks together; O*b*, jointed connection between rack and float; O*e*, frame or guide for double rack; O*d*, screw secured to frame or guide O*e*, and serving to slide it from side to side; O*e*, movable nut, in shape resembling such as are used in any ordinary opera-glass, and operating on screw O*d*, so as to move frame and rock together on screws or pins at slots O*s*; O*f*, friction-rollers having an easy bearing on double rack to hold it to its work on cog-wheel O*g*; O*g*, cog-wheel or pinion driven by double rack; O*h*, cog-wheel on shaft with pinion O*g*, and turning with it and driving pinion O*i*; O*i*, pinion driven by cog-wheel O*h*, and on shaft with cog-wheel O*k* and turning with it; O*l*, pinion driven by O*k* and driving fly-wheel on same shaft with it; O*m*, fly-wheel; O*n*, hand-lever to move nut O*e* to operate on screw O*d* to shift double rack; O*p*, long lever to operate same as O*n*, but thus extending vertically downward when the tide is at rest. Double rack would be free to play up or down without touching pinion O*g*, but being acted upon by the current from either direction it will move nut O*e* so as to shift the frame and rack and force a bearing on pinion or cog-wheel O*g*; O*q*, surface of lever which below reaches to low-water mark, expanded, so as to present sufficient resistance to the current to be moved to and fro by its changing course; O*r*, frame or socket for nut O*e* to play in; O*s*, slots for pins on frame-work A for sliding rack-guide by; R, rod or guide for friction-roller S or float B; S, friction-roller traversing on rod R.

Fig. 2 represents the reverse side of the frame O*e*, with double rack O O embraced in the friction-roller guides O*f*. It also shows the double rack in its bearing on pinion O*g* on shaft with O*h*, driving pinion O*i*. The frame and screw is also connected in the same figure with the nut or screw laid open.

Fig. 3 represents a hand-lever, O*n*, and the long current-lever O*q*, connected with nut O*e*; Fig. 4, the line of rack O O in a side elevation, showing its bearing on cog-wheel or pinion and shaft O*g*, together with the two other shafts and wheels and pinions for multiplying motion, as described in Fig. No. 1.

Fig. 5 represents the slotted rod, in connection with float B and nut O*e*, as designed to act on screw O*d* in Fig. No. 1, when used instead of lever O*q*, as represented in Fig. No. 3.

On Sheet No. 4, made part of these specifications, Fig. No. 1 represents the single rack and double pair of ratchets and pawls, in connection with float B—thus: A is the frame-work; B, float or vessel; P P, single rack; P*a*, connection of rack P and float B; P*b*, lower cam to open valve Q; P*e*, upper cam to open valve Q; P*ee*, spring to close valve Q; P*h*, pawls on cog-wheels P*q*; P*i*, ratchets on shaft P*k*; P*k*, shaft from which motion may be taken and multiplied.

Fig. 2 represents a side view of the twin ratchet, pawl, and spring on cog-wheel H; Fig. 3, the reverse side of Fig. 2; Fig. 4, side view of single rack P in guide P*f*.

Fig. 5 represents the independent screw from Sheet No. 1, with float or vessel connected on the outside and relieved from other combinations in such a manner as to show how it may be by simple brace-frame attached to any vessel and any wharf and made portable for that purpose—thus: A is the frame-work, pinioned or screwed together and secured to wharf by clamps or screws; B, vessel; B*a*, connection by any facile means; E*a*, screw or shaft turning wheel F; F, cog-wheel from which power may be taken and the motion accelerated, as heretofore described.

On Sheet of Drawing No. 5, made part of this specification, A is the frame-work; B, float or vessel; B*c*, connection of endless chain with float or vessel; B*a*, pulley; B*d*, windlass or drum driven by endless chain; B*b*, endless chain; B*e*, cog-wheel on shaft with drum or windlass B*d*; B*f*, pinion driven by cog-wheel B*e*; B*g*, drum on shaft with B*f* driving band B*h*; B*h*, band driving drum B*i*; B*i*, drum on shaft with drum B*k*; B*k*, drum driving band B*l*; B*l*, band driving drum B*m*; B*m*, drum on shaft with drum B*n*; B*n*, drum with pins or teeth driving belt B*o*; B*o*, belt with supporting rods and hooks depending on them; B*p*, friction-rollers on which belt B*o* moves; B*q*, twin rollers, between which hooks pass, over which belt B*o* turns; B*r*, beam turning on pivot B*s*; B*s*, pivot or shaft on which beam B*r* moves, and drums B*m* and B*n* revolve; B*t*, pawl acting on ratchet, similar on the reverse side, but opposite in action; B*u*, ratchet, its fellow on the reverse opposite range for changed motion; B*r*, pivot on which drop B*w* swings or depends; B*w*, drop or hinged knee extending band B*o* vertically; B*x*, connection of drop with the vessel; B*y*, hook depending from rod B*z*; B*z*, rod across belt from which hooks are hung.

*Structure and materials.*—I confine myself to no particular shape, size, or materials in the structure of my float or vessel, nor to any specified proportions in the mechanism to be used; nor to any part of the float or vessel to which attachment may be made, the most central being, of course, preferred for steadiness of motion. For a permanent and fixed purpose of driving machinery for factories and for warehouses I should prefer the square or rectangular, as presenting the largest surface to the tide.

I do not confine myself to the open-top vessel, but where preferable would use the perfectly tight closed one, and only allow it to be opened when the rising or gravitating power of the tide had been exhausted.

I do not confine myself to any size or number of valves, cams, or cords to be employed for emptying or filling the float, or to any particular size or kind of openings, but would use any well-known mechanical means for opening and closing the same.

I would suggest that the upright screw or twisted shaft might be of steel and coppered, or of some composition sufficiently alloyed with copper or other material calculated to resist the action of the salt water from corroding it; but I would adopt any materials most expedient for strength, durability, and economy.

I do not confine myself to any particular materials for the structure of any of the parts of any of my combinations, but would use whatever the locality and surrounding circumstances rendered most suitable and proper.

I do not confine myself to any particular shape or thread for my upright screw or shaft. The long twisted three cornered one is, however, exhibited in the drawings.

I do not confine myself to any given method for suspending the action of the pawls upon the ratchets for controlling motion; but would even suggest the use of cords and weights to be so arranged as to be used in single or double pairs simultaneously, if desired.

*Mode of operation.*—The mode of operating my tide water-works or automatic motor is almost self-evident from a view of the drawings accompanying the foregoing description of its structure. The vessel, as in Drawing or Sheet No. 1, is represented at rest at low-water mark, with the valve opened by tension of cord. The inner bottom of the vessel is sufficiently floated above the tide to allow its bouyancy to empty itself, or its descent may be stopped at any point above low-water mark, if desired, so as to allow it to be emptied, the valves being opened for that purpose. With the returning tide, the springs acting speedily upon the valves, unless sooner closed, will shut the same by the buoyancy of the float simultaneously with its action upon the screws, rack, or whatever other of forms of my combinations and arrangements may be employed. Having reached high-water mark, or a point below the same, it may be allowed to overflow by means of any ordinary governor precluding it from rising higher, or the valves may be opened by a cam or cams coming in contact therewith, as seen in Sheet No. 1, or by hand or any well-known automatic agency.

I do not claim the buoyant nor gravitating power of the tide; but

What I do claim, and desire to secure by Letters Patent, is—

1. The combination of a float, a screw-shaft, and the valve or valves for filling and emptying the same, substantially as shown and described.

2. The combination of a float with the double rack for communicating the power, substantially as shown and described.

3. The combination of a float with the single movable rack for communicating power, substantially as shown and described.

4. The double-sided valve, substantially as shown and described.

5. The combination of the screw, cog-wheels, ratchets, and pawls, substantially as shown and described.

6. The combination of the single rack and double ratchets and pawls, substantially as shown and described.

7. The arrangement of the double or twin pairs of ratchets and pawls, substantially as shown and described.

8. The combination of the double rack and wheels with the lever and screw and slotted rod and screw attached to frame-guide, substantially as shown and described.

9. The endless chain, pulley, drum, or windlass, in combination with the endless band or chain, rods, hooks, pulleys, beam, and hinged drop, substantially as shown and described, both for loading and unloading vessels and for other purposes.

A. W. SCHARIT.

Witnesses:
JOS. PECK,
WM. RYAN.